June 26, 1945.  E. L. LAWSON ET AL  2,379,307
CUTTING TOOL
Filed March 13, 1944   2 Sheets-Sheet 1

RAYMOND V. STEGMAN,
EVERETT L. LAWSON,
INVENTOR.

BY *[signature]*

ATTORNEY.

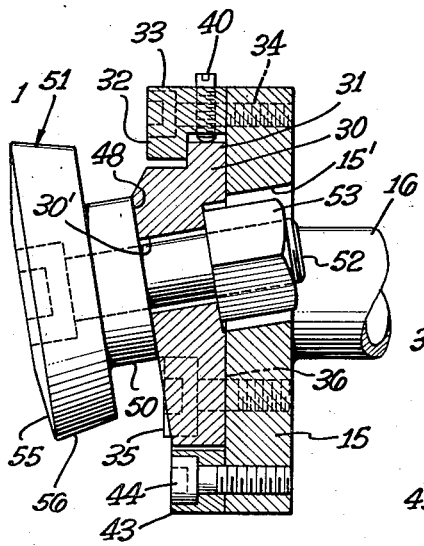
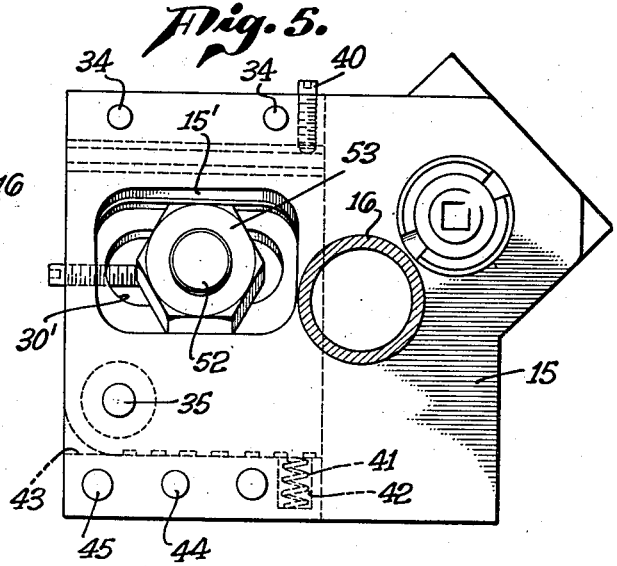
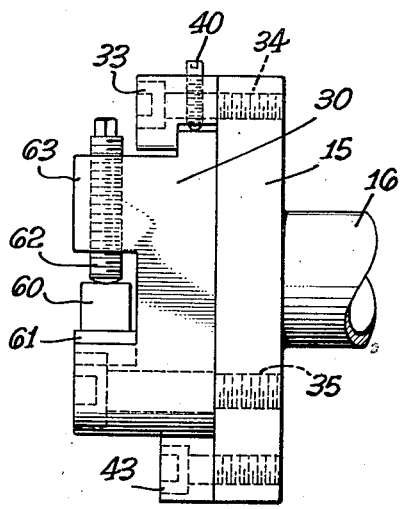
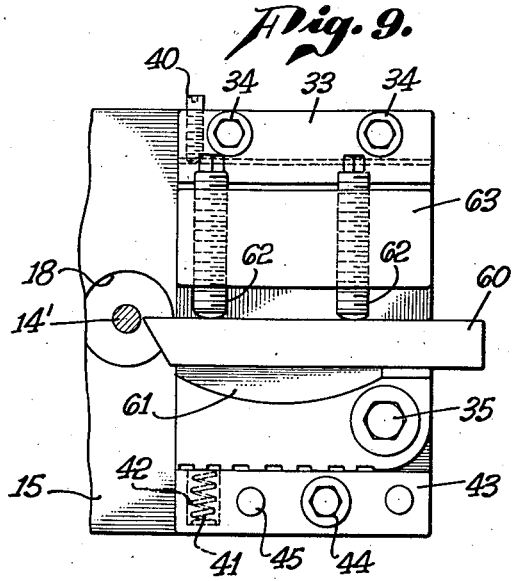
Raymond V. Stegman,
Everett L. Lawson,
INVENTOR.

Patented June 26, 1945

2,379,307

UNITED STATES PATENT OFFICE 2,379,307

CUTTING TOOL

Everett L. Lawson and Raymond V. Stegman,
Los Angeles, Calif.

Application March 13, 1944, Serial No. 526,155

2 Claims. (Cl. 82—35)

This invention relates to an improved cutting tool and tool holder. The tool is particularly adapted for turning down bars to required diameter and is designed to be mounted on the ordinary turret of a lathe or similar machine. In tools of the class referred to no provision is ordinarily made for automatically releasing the cutting edge of the tool from the work with the result that when the turret and the tool are removed from the work the cutting edge of the tool leaves a long scar or drag line on the finished bar or rod extending longitudinally of the same due to the tool by moving the turret in a reverse direction to its travel during the cutting operation.

One of the objects of this invention is to provide a tool and tool holder of simple form and construction that will automatically release the tool from contact with the work immediately at the end of the cutting operation and thereby clear the tool so that the turret and the tool may be moved away from the work without damage to the finished work.

Ordinarily tools of the class referred to require skilled labor to properly grind the tools and also require very accurate adjustment in more than one direction and it is one of the objects of this invention to provide a cutter and mounting of simple form and construction in which the cutter need only be ground on the rake angle to properly recondition the tool and provide a construction with which the tool may be easily and quickly reset as the leading and clearance angles of the tool remain the same on the cutter.

Other objects and advantages will appear hereinafter from the following description and drawings. Referring to the drawings, which are for illustrative purposes only.

Fig. 2 is a face view of the cutter and associated parts shown in Fig. 1 showing the cutter in cutting position;

Fig. 3 is a view similar to Fig. 2 showing the cutter in released position;

Fig. 4 is a side elevational view partly in section of the cutter, the holder and head upon which the holder is mounted and other parts shown in Fig. 2;

Fig. 5 is a rear view of the parts shown in Fig. 4;

Fig. 6 is a face view of the cutter looking at the notch;

Fig. 7 is a diagrammatic view showing the position of the cutter with relation to the work;

Fig. 8 is a side elevational view of a modified form of device embodying the present invention; and Fig. 9 is a face view of the form of device shown in Fig. 8.

Figure 1:
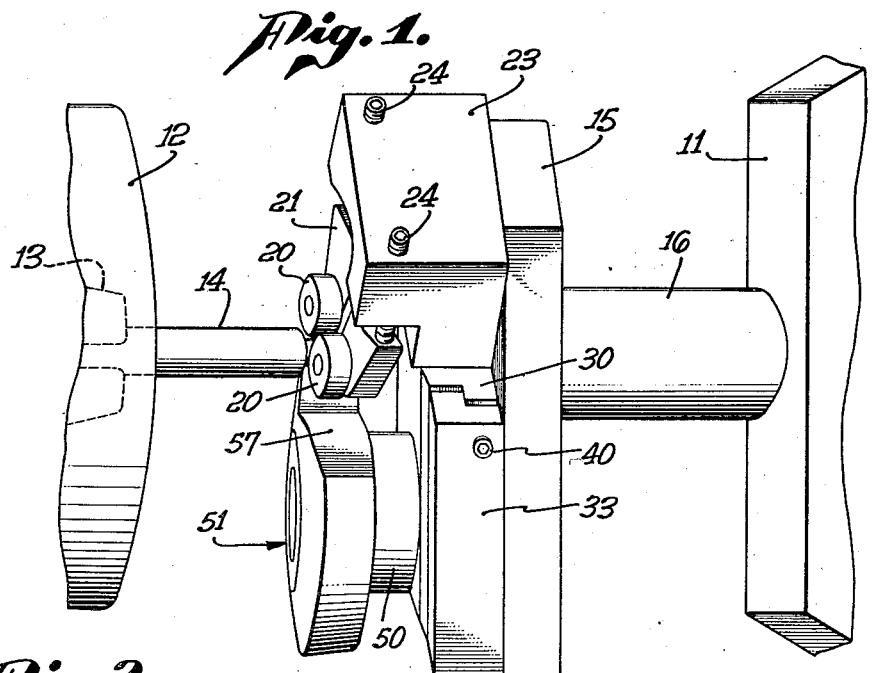
Fig. 1 is a plan view in perspective showing a cutter and tool holder embodying a form of the invention together with the associated parts of the machine.
Figure 1:
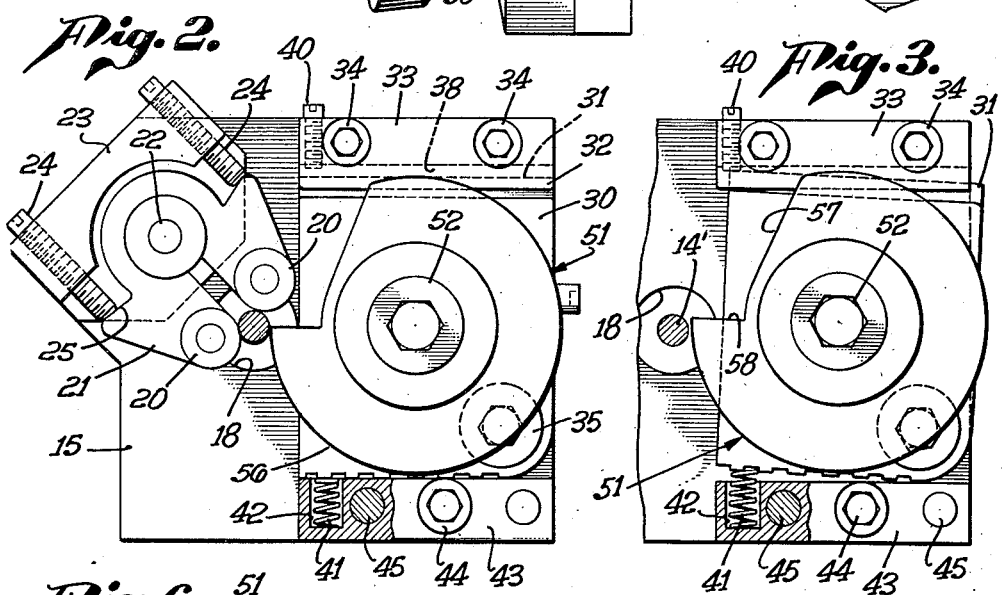
Figure 1:
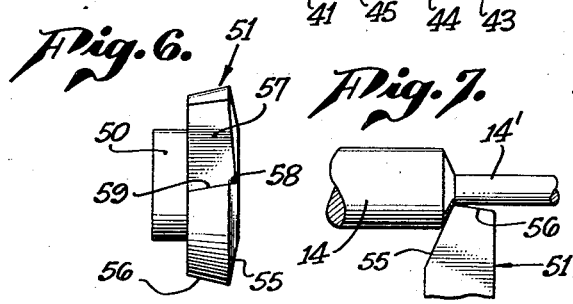

Referring more particularly to the drawings, 11 indicates a portion of the ordinary turret of a lathe or similar machine and 12 indicates the spindle of the ordinary lathe, the collet in which the stock is mounted being indicated at 13. It is to be understood that the collet is rotated in any well known manner with the consequence that the stock mounted in such collet similarly rotates.

The stock, indicated at 14, in the present instance, consists of a round bar which is to be turned down by the cutter to a lesser diameter as hereinafter described. 15 indicates a stationary head which in the present instance is a flat plate mounted on or formed as a part of a hollow stem 16 which extends into the turret 11, being secured therein in any well known manner. The hollow stem coincides with a hole in the head 15, indicated at 18 as shown in Figs. 2 and 3, it being understood that the finished work extends into the stem 16 through the hole 18 in the head as the operation of cutting progresses.

The bar 14, after being cut down or finished, is indicated at 14' and as shown in Fig. 2, is engaged opposite to the cutter by two guide rollers 20 which hold the bar firmly against the cutter during the cutting operation. These guide rollers are mounted on a bracket 21 which is pivotally mounted on a stud 22, the stud extending into and being supported by a block 23 which in turn is mounted in any suitable manner upon the head 15. The parts just described, that is, the rollers, the bracket and block 23, are of common form and construction and their particular construction forms no part of the present invention. The rollers 20 are adjustable with respect to the work by means of threaded bolts 24 which engage shoulders 25 on the bracket 21.

The tool holder consists of a plate indicated at 30 which has a flat face engaging against a similar face on the head 15. The upper portion of the plate 30 is provided with a flange 31 which is engaged by a flange 32 on a bar 33 which is secured to the head by means of bolts indicated at 34. The flange 32 on the bar 33 holds the upper portion of the holder 30 against the face of the head but not tightly enough to prevent tilting movement of the holder hereinafter referred to. The tool holder is substantially rectangular in shape and at a lower corner is pivotally mounted on the head 15 by means of a stud indicated at 35, the stud having a shoulder indicated at 36 which engages the face of the plate 15. Clearance is left at the top of the tool holder between the holder and bar 33 as indicated at 38 so that the tool holder is free to tilt on the head as indicated in Fig. 3. This tilting movement of the tool holder is limited by means of a threaded stop pin indicated at 40 which is mounted in the bar 33 and extending at its lower end into the space between the top of the tool holder and the bar. Provision is made for yieldingly tilting the tool holder upwardly. This consists of a coil spring 41 seated in a well 42 formed in a base plate or bar 43 secured by means of a bolt 44 and pins 45 to the head 15. The tool holder, when the tool is performing the cutting operation, rests against the upper face of the plate 43 as shown in Fig. 2 and as soon as the cutting operation is completed the tool is freed from the work and moves upwardly into the position shown in Fig. 3 due to the tilting of the tool holder as shown in that figure.

With the form of cutter shown in Figs. 1 to 7 inclusive, such cutter must be set at an angle to the face of the head 15 and for this purpose the tool holder is formed with an inclined face indicated at 48. This face forms a seat for the hub 50 of a circular cutter generally indicated at 51. The circular cutter 51 is secured to the holder 30 by means of a headed bolt indicated at 52 which extends through the holder, a nut 53 being threaded on the end of the bolt at the back of the holder 30.

For the purpose of allowing horizontal adjustment of the cutter on the tool holder the tool holder is provided with an elongated opening 30' and the head with an elongated opening 15' through which openings the bolt 52 extends.

The cutter 51 is in the form of a disk, one face of which is beveled as indicated at 55 forming a beveled face constituting the lead angle of the cutter. The periphery of the disk is angularly disposed with relation to the axis of the cutter, the peripheral face 56 forming the clearance angle and when the cutter is mounted at an angle as shown (see Fig. 4) the face of the periphery is slightly angular with respect to the axis of the work passing through the device, that is the peripheral face of the cutter clears the work except at the meeting point of the lead angle, the rake angle and the clearance angle.

The cutter is provided with a notch indicated at 57, one face of the notch indicated at 58 being substantially radial of the longitudinal axis of the cutter. This radial face forms the rake angle of the cutter.

When the cutter becomes dull it is only necessary to cut away the radial face 58 of the cutter preferably at an angle as shown at 59 (see Fig. 6).

As indicated hereinabove the cutting edge of the cutter engages the work at a point where the lead angle, the clearance angle and the rake angle coincide (see Fig. 2) and remains in such working engaging condition as the turret and tool holder are fed forward. However, on the completion of the cutting operation or the stoppage of the work feed the cutting portion of the cutter is relieved of engagement with the work and the tool holder tilts upwardly into the position shown in Fig. 3 in which position the cutting edge of the cutter becomes free of the work so that the tool may be removed out of contact with the work.

In the forms of the invention shown in Figs. 8 and 9 the head 15 and the mounting of the tool holder thereon are of the same construction as shown in the preceding figures. However, in the form shown in Figs. 8 and 9 the tool holder is designed to hold the ordinary bar cutter indicated at 60. This cutter rests upon a table indicated at 61 formed on the holder 30, the tool being firmly held on the table by means of threaded bolts or pins 62 which extend through a rib 63 formed as a part of the holder 30. The action of releasing the cutter from the work is the same with respect to the form shown in Figs. 8 and 9 as in the preceding figures due to the fact that the holder 30 is mounted on the head 15 in the same manner as that shown in the preceding figures.

While we have shown and described two forms of our invention it is to be understood that various modifications and changes can be made without departing from the scope of the invention and it is intended to cover such changes as come within the claims.

We claim as our invention:

1. A cutting tool comprising: a stationary head having a vertically disposed flat face; a tool holder against the flat face of the head; means for pivotally mounting the tool holder on the head; a retaining plate secured to the head extending over the upper portion of the tool holder; stop means on said retaining plate engageable with the upper face of the tool holder; a base plate on said head engageable with the lower face of the tool holder; yieldable means mounted on said base plate engageable with said tool holder; and a cutter angularly mounted on said tool holder.

2. A cutting tool comprising: a stationary head having a vertically disposed flat face; a hollow stem on said head; a tool holder pivotally mounted on said head against the flat face of the head; a base plate on said head engageable by the tool holder, a coil spring mounted in said base plate engageable with said tool holder, a bar mounted on the upper portion of the head engageable over the upper portion of the tool holder; adjustable stop means for said tool holder mounted in said bar, said tool holder having an angular face, a circular cutter mounted on the angular face of the tool holder angularly disposed with relation to the head; and means whereby the cutter may be held in horizontally adjusted position on the tool holder.

EVERETT L. LAWSON.
RAYMOND V. STEGMAN.